United States Patent
Metrikin

(10) Patent No.: US 6,378,373 B1
(45) Date of Patent: Apr. 30, 2002

(54) HIGH-SPEED BEARING VIBRATIONAL ANALYSIS SYSTEM

(75) Inventor: Alex Metrikin, Los Angeles, CA (US)

(73) Assignee: New Hampshire Ball Bearings, Inc., Chatsworth, CA (US)

( * ) Notice: Subject to any disclaimer, the term of this patent is extended or adjusted under 35 U.S.C. 154(b) by 0 days.

(21) Appl. No.: 09/710,528

(22) Filed: Nov. 9, 2000

(51) Int. Cl.$^7$ .............................................. G01M 13/04
(52) U.S. Cl. ............................ 73/593; 73/587; 73/659; 73/660
(58) Field of Search .......................... 73/593, 660, 662, 73/663, 587, 1.15, 1.19, 659

(56) References Cited

U.S. PATENT DOCUMENTS

| | | | |
|---|---|---|---|
| 2,796,759 A | 6/1957 | Baugh et al. | 73/593 |
| 3,332,277 A | 7/1967 | Blinder | 73/593 |
| 3,665,578 A * | 5/1972 | Tiller | 73/862.381 |
| 3,699,806 A * | 10/1972 | Weichbrodt | 73/593 |
| 3,745,815 A | 7/1973 | Bentone et al. | 73/593 |
| 4,579,487 A * | 4/1986 | Lehmkuhl | 409/134 |
| 4,729,239 A | 3/1988 | Gordon | 73/593 |
| 5,263,372 A * | 11/1993 | Matsuzaki et al. | 73/593 |
| 5,495,764 A | 3/1996 | Matsuzaki et al. | 73/593 |
| 5,511,422 A | 4/1996 | Hernandez | 73/593 |
| 5,517,858 A | 5/1996 | Matsuzaki et al. | 73/593 |
| 5,677,488 A * | 10/1997 | Monahan et al. | 73/593 |
| 5,703,295 A | 12/1997 | Ishida et al. | 73/593 |
| 5,889,218 A | 3/1999 | Sato et al. | 73/865.8 |
| 6,053,047 A | 4/2000 | Dister et al. | 73/593 |
| 6,234,022 B1 * | 5/2001 | Tadokoro | 73/593 |

* cited by examiner

Primary Examiner—Hezron Williams
Assistant Examiner—Jacques Saint-Surin
(74) Attorney, Agent, or Firm—Pillsbury Winthrop LLP

(57) ABSTRACT

A high-speed bearing vibrational analysis system for testing a bearing includes a bearing holding member to accommodate a shaft and the bearing. The bearing holding member is adapted to rotate the bearing at high-speeds. The shaft is inserted into an accommodation portion of the bearing holding member. A vibration sensor is in contact with the bearing to detect vibrations of the bearing, while it is rotated at high speeds, and to transmit data for analysis. A computer system is provided for executing a software program that receives and analyzes the data from the vibration sensor.

34 Claims, 7 Drawing Sheets

600

HIGH-SPEED BEARING VIBRATIONAL ANALYSIS SYSTEM

BACKGROUND OF THE INVENTION

1. Field of the Invention

The present invention relates generally to a bearing analysis system, and more specifically, to a computerized bearing analysis system capable of operating at high-speeds to test the bearing at its normal operational levels.

2. Discussion of the Related Art

Anderonmeter machines are typically used for vibration or noise analysis of precision ball bearings, and particularly those used in high-speed dental handpieces. The Anderonmeter machine generally operates at speeds of at least 200 times lower than the actual operating speeds of a bearing in a high-speed dental handpiece. The Anderonmeter machine operates by spinning a test bearing on a test rig, and applying or touching a reading needle to the outer ring of the test bearing to produce an acoustic output. An operator uses a set of headphones to listen to the acoustic output to detect any unusual noises during the test.

Because Anderonmeter machines operate at speeds far less than the actual operating speeds for which the bearings are designed, the data collected with the Anderonmeter machines often do not represent the real vibrational characteristics of the bearings used in a real-world application. For example, bearing vibrations analyzed at a rotation speed of 1,800 revolutions-per-minute (rpms), the typical rotation speed of an Anderonmeter machine, do not provide complete information regarding the bearing in a real-world application. In a high-speed bearing for use in dental applications, for example, the operational rotation speed may range from approximately 350,000 to 500,000 rpms. This testing methodology is analogous to testing a race car at 5 miles-per-hour (mph) and then assuming that the race car will perform as well at 200 mph.

A number of factors influence the vibrational behavior of a bearing at different speeds. Centrifugal forces are an important factor, and at speeds of 350,000 to 500,000 rpms, the centrifugal forces are high. For example, each one millimeter (mm) steel ball of a small dental bearing rotating at 500,000 rpms presses against the outer ring of a bearing with approximately 1.5 pounds (lbs.) of force. These forces greatly influence the operational nature of the bearings, not to mention the lubricants utilized within the bearings. Therefore, a tremendous advantage is to be gained by being able to test bearings at their high operational speeds because many characteristics may be measured incorrectly at lower test speeds.

Additionally, with an Anderonmeter machine, because an operator listens using a set of headphones, human error may contribute to inaccurate readings, and the data collected may not be consistent from one operator to another.

Another method to measure for vibrations or noise of a high-speed bearing is to directly measure the roundness and finish of the raceway (the groove in which the balls rest) with a measuring needle. Although the quality of the raceway is a strong determinator of smooth and quiet operation of the high-speed bearing, it is not the only determinant. Therefore, measuring the raceway quality alone is not sufficient to predict how a high-speed bearing will operate.

DETAILED DESCRIPTION

Figure 1:
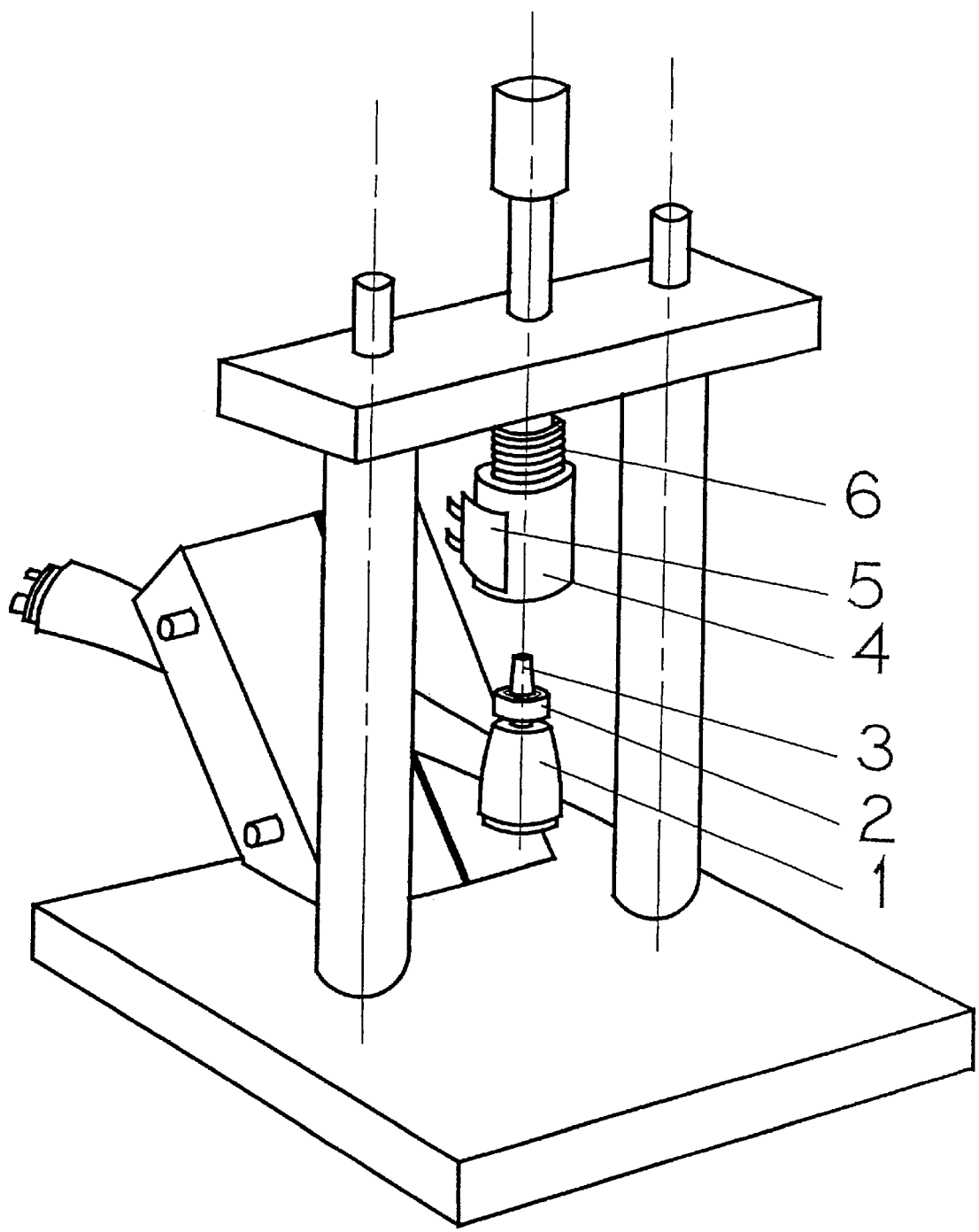
FIG. 1 illustrates a perspective view of a high-speed vibrational analysis system according to an embodiment of the present invention.
Figure 2:
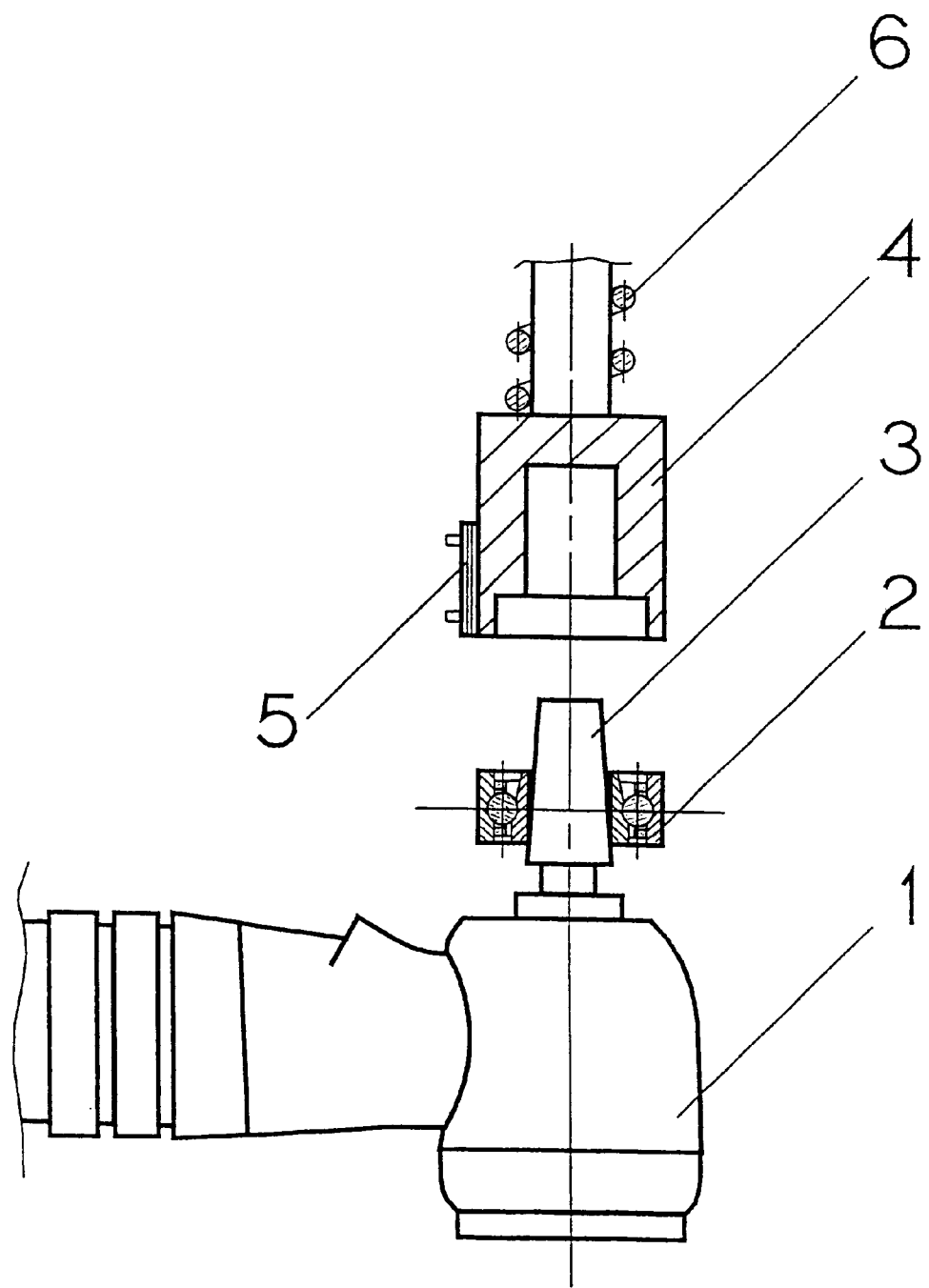
FIG. 2 illustrates a side view of a high-speed vibrational analysis system according to an embodiment of the present invention.

FIG. 1 illustrates a perspective view of a high-speed vibrational analysis system according to an embodiment of the present invention. The high-speed bearing vibration analysis system preferably includes a support member for supporting a test bearing holding member 1, such as a conventional dental handpiece. The conventional dental handpiece may be any high-speed dental handpiece used by a dentist, such as the "Tradition" model manufactured by Midwest Dental Products Corporation (Des Plaines, Ill.). The bearing holding member 1 is preferably supported in a horizontal position so that an opening of an accommodation portion of the bearing holding member 1, to accommodate a shaft 3 and a test bearing 2, is facing upwards. However, any other suitable configuration may be utilized. The accommodation portion of the bearing holding member 1 includes a drive mechanism to drive and rotate the bearing 2 at its normal high operational speeds during its testing. As illustrated in FIG. 2, the test bearing 2 rests on the shaft 3, and the shaft 3 is coupled to a drive mechanism housed inside the holding member 1.

The shaft 3 is preferably a tapered shaft that is placed into the accommodation portion of the bearing holding member 1. If a dental handpiece is utilized as the bearing holding member 1, then, the dental handpiece is preferably supported in an inverted and upright horizontal position so that the "chuck assembly" of the dental handpiece that holds the burr/drill bit is facing upwards, as shown in the example of FIG. 1. The shaft 3 is inserted into the accommodation portion of the bearing holding member 1, followed by placement of the bearing 2 onto the shaft 3. If the bearing holding member 1 is supported in a horizontal position as illustrated in FIG. 1, then the shaft 3 is preferably vertically inserted into the accommodation portion of the bearing holding member 1. If a dental handpiece is utilized as the bearing holding member 1, the shaft 3 is inserted into the chuck assembly of the dental handpiece, as if it were a burr or dental drill bit. The bearing 2 to be tested is then placed onto the shaft 3.

Figure 3:
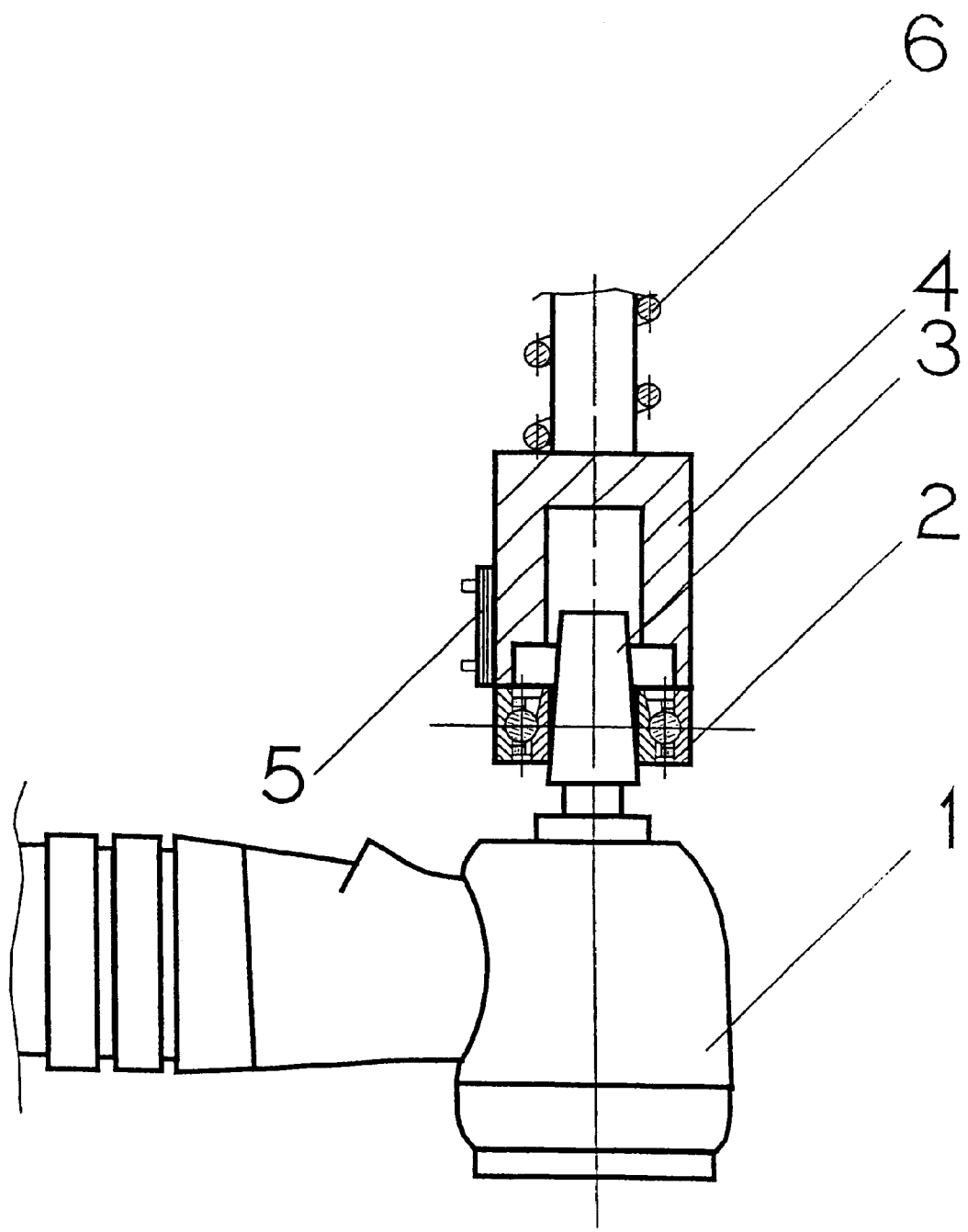
FIG. 3 illustrates a side operational view of a high-speed vibrational analysis system according to an embodiment of the present invention.

Once the shaft 3 and bearing 2 are secured, a piston 4 is preferably positioned to be in contact with the bearing 2 to be tested (see FIG. 3). The piston 4 is preferably loaded with a spring 6 so as to facilitate contact of the piston 4 with the bearing 2 and to provide a pre-load force onto the bearing. The pre-load force applied onto the bearing is preferably about three-quarter pounds (¾ lbs.).

As shown in the embodiment of FIG. 1, the piston 4 may be lowered onto the bearing 2 to be tested, and is preferably lowered onto the outer ring of the test bearing 2 (see FIG. 3). At the contact end of the piston 4 is a vibration sensor 5 coupled to the piston 4. The vibration sensor 5 is of a suitable size for the bearing 2 to be tested. The vibration sensor 5 is preferably a piezoelectric vibration detection device, such as a piezo film sensor, such as the LDT0 Solid State Switch/Vibration Sensor manufactured by Measurement Specialties, Inc. (Valley Forge, Pa.).

Once the piston 4, along with the vibration sensor 5, is placed onto the bearing 2 with the pre-load force, the drive mechanism of the bearing holding member 1 may be actuated to drive and rotate the bearing 2 at a desired speed for testing the bearing 2. If a high-speed bearing for use in a dental handpiece is being tested, the drive mechanism is adapted to rotate the test bearing 2, for example, from 350,000 to 500,000 rpms, the operational speed of a dental handpiece in which the bearing 2 is adapted to perform.

Figure 4:
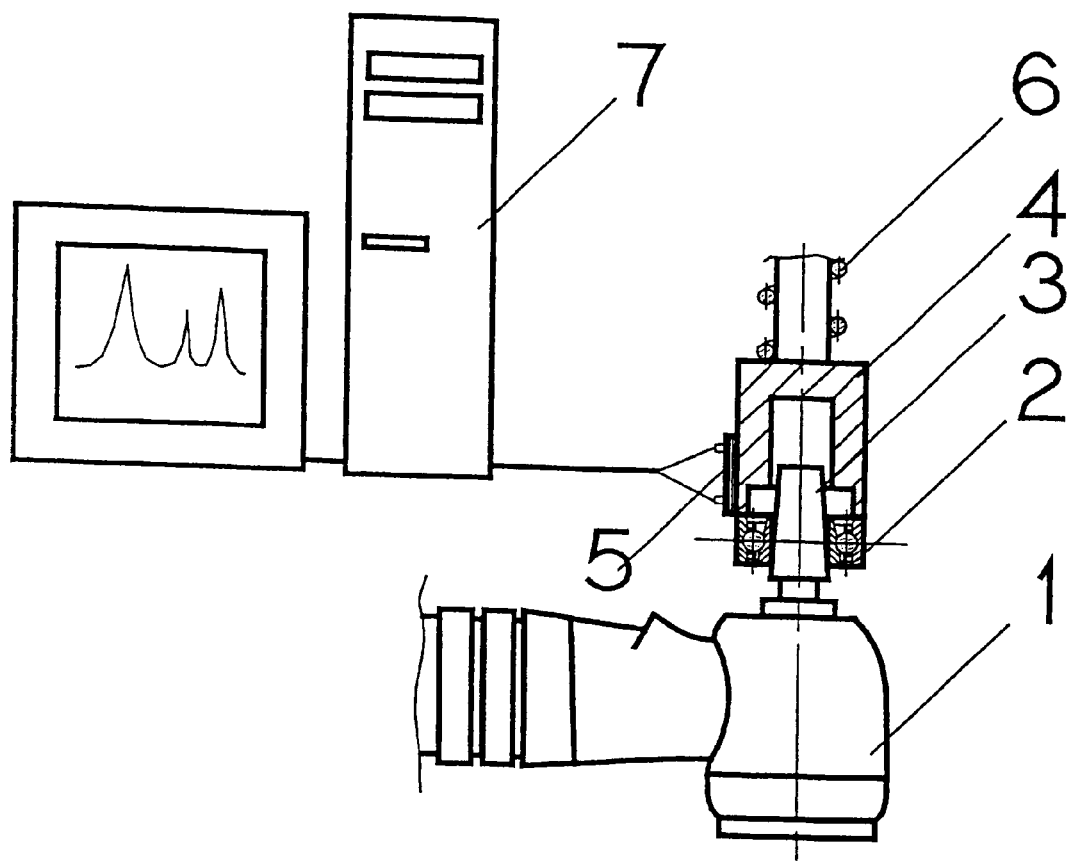
FIG. 4 illustrates a high-speed vibrational analysis system coupled to a computer system according to an embodiment of the present invention.

FIG. 4 illustrates a high-speed vibrational analysis system coupled to a computer system according to an embodiment of the present invention. The vibration sensor 5 detects the vibrations of the bearing during testing and transmits the vibrational data to a computer system 7 that receives and processes the vibrational data. In the case of a piezoelectric vibration sensor 6, the vibrations detected from the bearing 2 are converted into electrical signals, which are then transmitted to the computer system 7 to be analyzed. A cable may be provided to connect the piezoelectric vibration sensor 6 to the computer system 7 so that the computer system 7 may receive the electrical signals generated by the piezoelectric vibration sensor 6 due to vibrations detected during the testing of the bearing 2. The computer system 7 is preferably executing a software program that is adapted to receive the vibrational data from the vibration sensor 5 and analyze the vibrational data. The computer system 7 may be any suitable computer system, such as a PC-compatible computer system, operating under, for example, the Microsoft Windows operating system. The software program may be any spectral analysis program, which generates a spectral diagram based on the vibrational data obtained from the vibration sensor 5 for analysis. Mainly, the software program is adapted to perform fast-Fourier transform (FFT) operations based on the data received from the vibration sensor 6. The vibration data associated with the operation of the bearing holding member 1 and the rotation of the bearing 2 is filtered and processed by the software program to generate test results.

Figure 5:
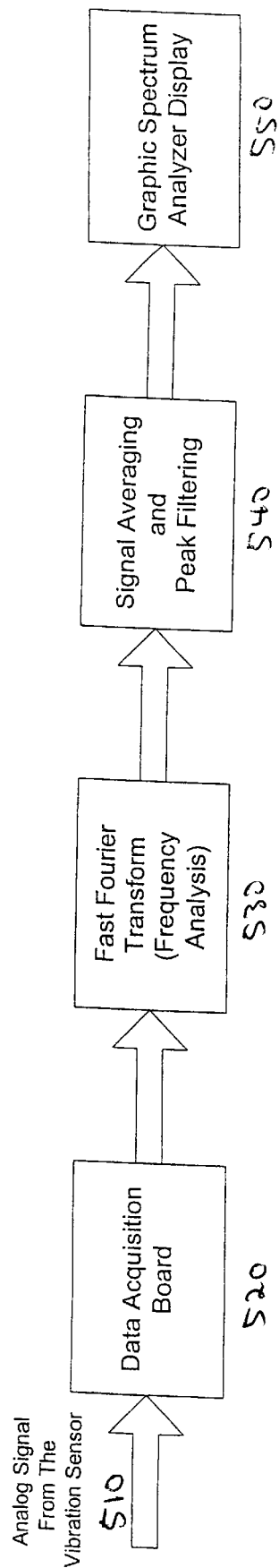
FIG. 5 illustrates a flow chart diagram of an operation of acquiring data and generating a spectral diagram according to an embodiment of the present invention.

FIG. 5 illustrates a flow chart diagram of an operation of acquiring data and generating a spectral diagram according to an embodiment of the present invention. Vibrations from the operation of the test bearing 2 detected by the vibration sensor 5 are converted into analog signals 510 and transmitted to the data acquisition board/interface 520 of the computer system 7 to provide the analog signals to the software program executing on the computer system 7. The software program performs a fast Fourier transform (FFT) (frequency analysis) 530 on the data derived from the analog signals received from the vibration sensor 5. Signal averaging and peak filtering 540 are preferably performed on the data after the FFT 530 has been performed. Then, the data is prepared by the software program for display, for example, as a graphic spectrum analyzer display 550.

Accordingly, the software program may generate a spectral diagram based on the vibrational data. The spectral diagram may be used for comparison to a predetermined standard, or to data obtained from other bearings. By reviewing the spectral diagram generated by the software program, the smoothness and quietness of a tested high-speed bearing may be determined for use at its real-world operational speed.

Figure 6:
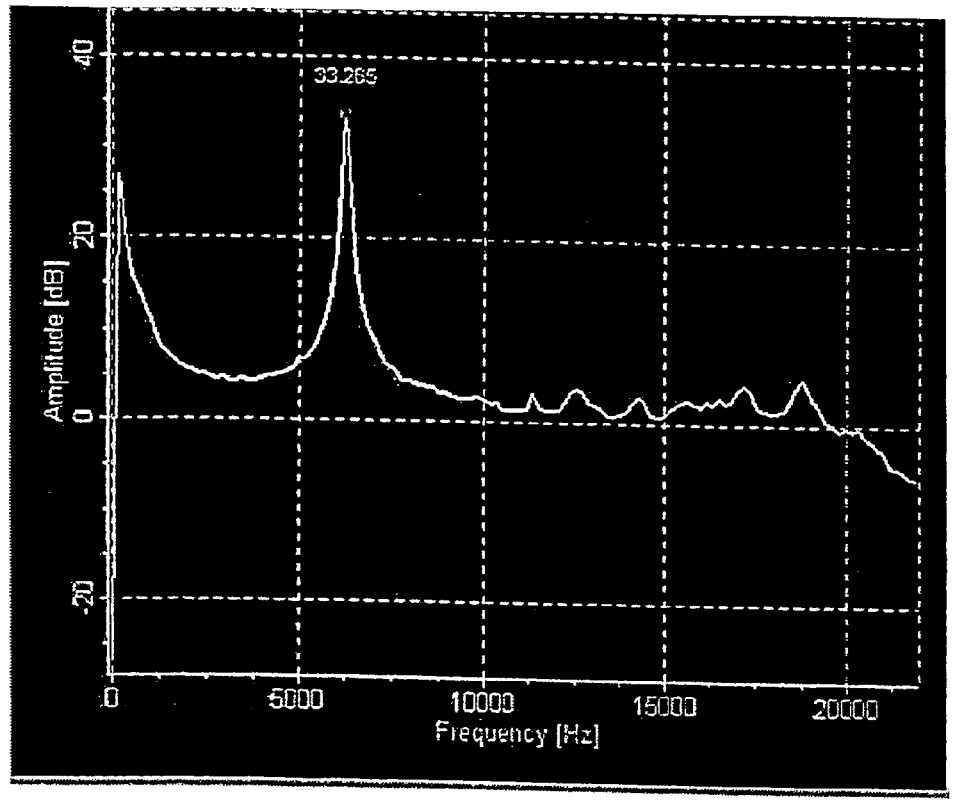
FIG. 6 illustrates a sample spectral diagram of a preferred bearing generated by a high-speed vibrational analysis system according to an embodiment of the present invention.
Figure 7:
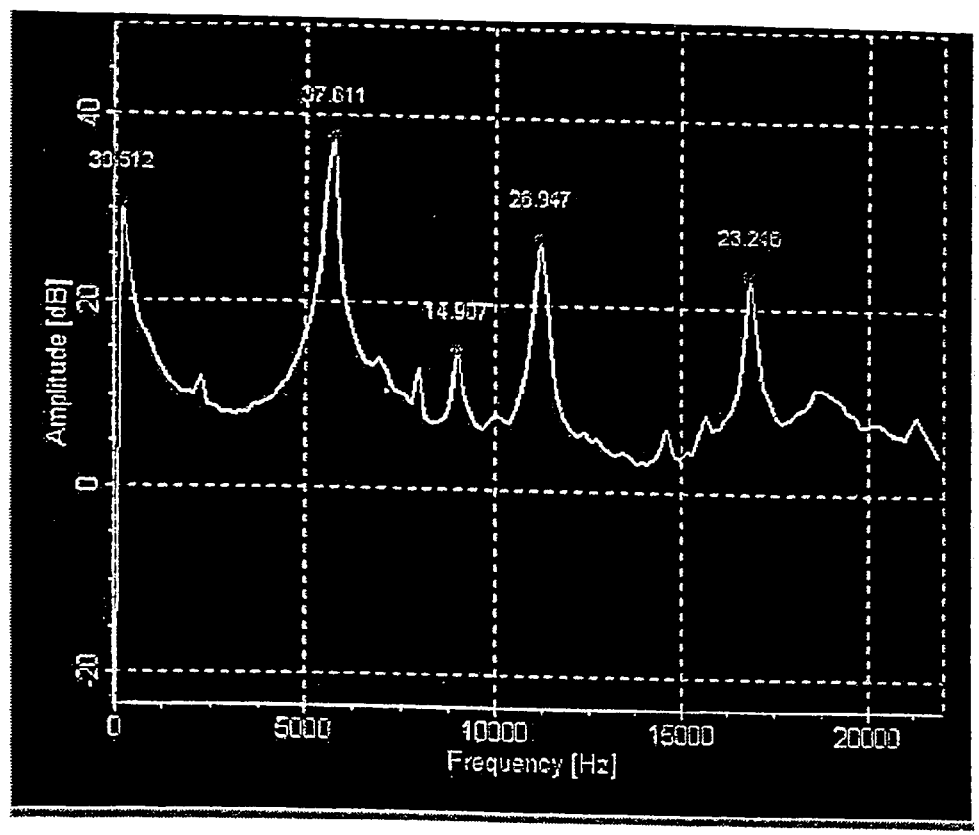
FIG. 7 illustrates a sample spectral diagram of an inferior bearing generated by a high-speed vibrational analysis system according to an embodiment of the present invention.

FIGS. 6 and 7 illustrate sample spectral diagrams of a preferred bearing and an inferior bearing, respectively, generated by a high-speed vibrational analysis system according to an embodiment of the present invention. As illustrated by spectral diagram 600 of FIG. 6, a single peak in amplitude (33.265 dBs) at about 6,300 Hz is observed following the initial peak from the start. However, in the spectral diagram 700 of FIG. 7 of an inferior performing test bearing, three major peaks in amplitude (37.611 dBs, 26.947 dBs, and 23.246 dBs) at about 6,200 Hz, 11,250 Hz, and 17,400 Hz. respectively, and a smaller peak in amplitude (14.907 dBs) at about 8,750 Hz, are observed following the initial peak from the start.

Therefore, by viewing the graphical representations of the spectral diagrams 600, 700 illustrated in FIGS. 6 and 7, one can determine that the spectral diagram 600 having lower and fewer peaks in amplitude (in decibels as measured from the detected vibrations) represents the smoother performing bearing, as compared to the bearing that produced spectral diagram 700. In other words, smoother performing bearings produce lower vibrations and have fewer irregularities, and thus produce spectral diagrams having lower amplitudes and fewer peaks at the various operating frequencies. The spectral diagrams may provide numerical values along with graphical displays that may be utilized for analysis and comparison. Accordingly, the analysis performed by the computer system 7 (with the software program) requires less training than that of training an operator to listen to the acoustic outputs of an Anderonmeter machine, for example, and produces more consistent and objective results. Moreover, Anderonmeter machines can cost upwards of about $20,000, while a high-speed bearing vibrational analysis system according to an embodiment of the present invention may be provided for around $1,000 or less.

While the description above refers to particular embodiments of the present invention, it will be understood that many modifications may be made without departing from the spirit thereof. The accompanying claims are intended to cover such modifications as would fall within the true scope and spirit of the present invention. The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A high-speed bearing vibrational analysis system for testing a bearing, comprising:
   a bearing holding member to accommodate a shaft and the bearing, the bearing holding member rotates the bearing at a speed of at least 350,000 revolutions-per-minute (rpms), wherein the shaft is inserted into an accommodation portion of the bearing holding member;
   a vibration sensor in contact with the bearing to detect vibrations of the bearing and to transmit data for analysis; and
   a computer system executing a software program to receive and analyze the data from the vibration sensor.

2. The high-speed bearing vibrational analysis system according to claim 1, further including a piston adapted to apply a force onto the bearing, wherein the vibration sensor is coupled to the piston.

3. The high-speed bearing vibrational analysis system according to claim 2, wherein the piston is extendable and retractable from the bearing.

4. The high-speed bearing vibrational analysis system according to claim 2, wherein the piston is spring-loaded.

5. The high-speed bearing vibrational analysis system according to claim 2, wherein the force applied onto the bearing by the piston is approximately three-quarter pounds (¾ lbs.).

6. The high-speed bearing vibrational analysis system according to claim 1, wherein the bearing holding member is a dental handpiece.

7. The high-speed bearing vibrational analysis system according to claim 1, wherein the vibration sensor is a piezoelectric device.

8. The high-speed bearing vibrational analysis system according to claim 1, wherein the computer program produces a test result in the form of a spectral diagram.

9. The high-speed bearing vibrational analysis system according to claim 1, wherein the computer program performs a fast-Fourier transform (FFT).

10. A high-speed bearing vibrational analysis system for testing a bearing, comprising:
    a bearing holding member coupled to the analysis system to accommodate a tapered shaft and the bearing, the bearing holding member rotates the bearing at a speed of at least 350,000 revolutions-per-minute (rpms), wherein the tapered shaft is inserted into an accommodation portion of the bearing holding member;
    a spring-loaded piston adapted to apply a force onto the bearing;
    a piezoelectric vibration sensor coupled to the piston to detect vibrations of the bearing and to transmit an electrical signal for analysis; and
    a computer system executing a software program to receive and analyze the electrical signal from the piezoelectric vibration sensor.

11. The high-speed bearing vibrational analysis system according to claim 10, wherein the bearing holding member is a dental handpiece.

12. The high-speed bearing vibrational analysis system according to claim 10, wherein the piston is extendable and retractable from the bearing.

13. The high-speed bearing vibrational analysis system according to claim 10, wherein the force applied onto the bearing by the piston is approximately three-quarter pounds (¾ lbs.).

14. The high-speed bearing vibrational analysis system according to claim 10, wherein the computer program produces a test result in the form of a spectral diagram.

15. The high-speed bearing vibrational analysis system according to claim 10, wherein the computer program performs a fast-Fourier transform (FFT).

16. A method of operating a high-speed bearing vibrational analysis system for testing a bearing, comprising:
    inserting a shaft into an accommodation portion of a bearing holding member, wherein the bearing holding member accommodates the shaft and the bearing, and rotates the bearing at a speed of at least 350,000 revolutions-per-minute (rpms);
    placing the bearing onto the shaft;
    rotating the bearing at the speed of at least 350,000 rpms;
    receiving data from a vibration sensor in contact with the bearing; and analyzing the data received from the vibration sensor to generate a test result.

17. The method according to claim 16, further including applying a force onto the bearing.

18. The method according to claim 17, wherein a piston applies the force onto the bearing, the piston being extendable and retractable from the bearing.

19. The method according to claim 18, wherein the piston is spring-loaded.

20. The method according to claim 18, wherein the force applied onto the bearing by the piston is approximately three-quarter pounds (¾ lbs.).

21. The method according to claim 16, wherein the bearing holding member is a dental handpiece.

22. The method according to claim 16, wherein the vibration sensor is a piezoelectric device.

23. The method according to claim 16, wherein the test result generated is a spectral diagram.

24. The method according to claim 16, wherein the step of analyzing the data utilizes a fast-Fourier transform (FFT).

25. The method according to claim 16, wherein the step of analyzing the data received from the vibration sensor is performed by a computer system.

26. A method of operating a high-speed bearing vibrational analysis system for testing a bearing, comprising:
    inserting a shaft into an accommodation portion of a bearing holding member, wherein the bearing holding member accommodates the shaft and the bearing, and rotates the bearing at a speed of at least 350,000 revolutions-per-minute (rpms);
    placing the bearing onto the shaft;
    applying a force onto the bearing;
    rotating the bearing at the speed of at least 350,000 rpms;
    receiving data from a vibration sensor in contact with the bearing; and
    analyzing the data received from the vibration sensor to generate a test result.

27. The method according to claim 26, wherein the bearing holding member is a dental handpiece.

28. The method according to claim 26, wherein a piston applies the force onto the bearing, the piston being extendable and retractable from the bearing.

29. The method according to claim 28, wherein the piston is spring-loaded.

30. The method according to claim 28, wherein the force applied onto the bearing by the piston is approximately three-quarter pounds (¾ lbs.).

31. The method according to claim 26, wherein the vibration sensor is a piezoelectric device.

32. The method according to claim 26, wherein the test result generated is a spectral diagram.

33. The method according to claim 26, wherein the step of analyzing the data utilizes a fast-Fourier transform (FFT).

34. The method according to claim 26, wherein the step of analyzing the data received from the vibration sensor is performed by a computer system.

* * * * *